(12) United States Patent
Bostock et al.

(10) Patent No.: US 7,587,391 B1
(45) Date of Patent: Sep. 8, 2009

(54) METHOD AND APPARATUS FOR GENERATING A PREFERENCE RANKING

(75) Inventors: Michael C. Bostock, San Francisco, CA (US); Alexander C. Wu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 11/452,527

(22) Filed: Jun. 13, 2006

(51) Int. Cl.
 *G06F 17/30* (2006.01)
(52) U.S. Cl. .................................. 707/3; 707/4; 707/10
(58) Field of Classification Search .................. 707/3, 707/10, 4
See application file for complete search history.

(56) References Cited

U.S. PATENT DOCUMENTS

| | | | |
|---|---|---|---|
| 6,285,999 B1 | 9/2001 | Page | 707/5 |
| 6,799,176 B1 | 9/2004 | Page | 707/5 |
| 6,954,755 B2 * | 10/2005 | Reisman | 707/10 |
| 2007/0022068 A1 * | 1/2007 | Linsker | 706/23 |
| 2007/0239764 A1 * | 10/2007 | Song et al. | 707/102 |

OTHER PUBLICATIONS

Publication: "Ranking by Pairwise Comparison: A Note on Risk Minimization", by Hullermeier and Furnkranz, Deparemtnt of Mathematics and Computer Science, Marburg University, Germany, wwwiti.cs.uni-magdeburg.de/iti_dke/publications/mpub109.pdf.
Publication: "Searching the web with eigenvectors", by Herbert S. Wilf, University of Pennsylvania, Philadelphia, PA 19104-6395, Apr. 13, 2001, www.math.utsc.utoronto.ca/b24/KendallWei.pdf.
Publication: "Comparison of Ranking Procedures in Pairwise Preference Learning", by Hullermeier and Furnkranz, Proc. $10^{th}$ Int. Conf. Information Processina dna Management, wwwiti.cs.uni-magdeburg.de/iti_dke/publications/IPMU2004.pdf.
Publication: "Pairwise Preference Learning and Ranking" by Furnkranz and Hullermeier, Lecture notes in Computer Science, publisher: Springer Berlin/Heidelberg, vol. 2837/2003, pp. 145-156, ISBN: 3-540-20121-1.

* cited by examiner

*Primary Examiner*—Baoquoc N To
(74) *Attorney, Agent, or Firm*—Park, Vaughan & Fleming LLP

(57) ABSTRACT

One embodiment of the present invention provides a system that produces a preference ranking for a set of items based on preferences expressed by users. During operation, the system collects preferences from users between pairs of items in the set of items to be ranked. Next, the system then uses the collected preferences to compute an adjacency matrix for the set of items, wherein each element in the adjacency matrix represents preferences between a corresponding pair of items associated with the element. The system then uses the adjacency matrix to compute the preference ranking for the set of items.

23 Claims, 3 Drawing Sheets

METHOD AND APPARATUS FOR GENERATING A PREFERENCE RANKING

BACKGROUND

1. Field of the Invention

The present invention generally relates to techniques for analyzing data. More specifically, the present invention relates to methods for assigning ranks to data items in a collection of data items, such as a database of documents, the world wide web, or any other collection of data items which can be compared by a person.

2. Related Art

The relentless growth of the Internet has been largely fueled by the development of sophisticated search engines, which enable users to comb through billions of web pages looking for specific pages of interest. Because a given query can return millions of search results it is important to be able to rank these search results to present the highest-quality results to the user.

It is impossible to measure the quality of results directly. Early techniques for ranking results considered intrinsic properties of each candidate result document, including "(a) how recently the document was updated, and/or (b) how close the search terms are to the beginning of the document" (U.S. Pat. No. 6,799,176, col. 1, lines 56-58). U.S. Pat. No. 6,799,176 introduced a new technique which considers an extrinsic property: the back-links for linked documents. This provides a better approximation of quality as it recursively infers popularity. However, even this property is somewhat under authorial control and is thus vulnerable to "spamming" techniques, especially when page authors collude to set up elaborate link structures to inflate their documents' rankings. Furthermore, these properties reflect the collective opinion of page authors, which may not match the opinion of the much larger pool of web searchers (users).

Hence, it is desirable to obtain a more direct measurement of quality from users themselves. If one can measure quality accurately by interacting with or observing users, one can produce a ranking that more closely correlates with the "ideal" ranking desired by users.

However, it is difficult to infer quality from users directly. Passive observation techniques, such as click-tracking, are noisy and difficult to interpret. For example, a user cannot see a page without clicking on it, and so a click does not necessarily correspond to a good result. Direct solicitation techniques, such as satisfaction surveys, have a number of problems. For example, they generally have low response rates, may be difficult for users to understand, and may be difficult to aggregate into a ranking because users vary greatly in the degree and direction of opinion.

Pairwise comparisons and preference orderings provide a better candidate for aggregation, but still present some difficulties: users differ in opinion (some prefer item A while others prefer item B); users are inconsistent (a user might prefer A to B, and B to C, while preferring C to A); and user preferences are relatively difficult and expensive to obtain, which limits the set of data points from which to derive the ranking.

Hence, what is needed is a method and an apparatus for accurately ranking search results without the problems of the above-described techniques.

SUMMARY

One embodiment of the present invention provides a system that produces a preference ranking for a set of items based on preferences expressed by users. During operation, the system collects preferences from users between pairs of items in the set of items to be ranked. Next, the system uses the collected preferences to compute an adjacency matrix for the set of items, wherein each element in the adjacency matrix represents preferences between a corresponding pair of items associated with the element. The system then uses the adjacency matrix to compute the preference ranking for the set of items.

In a variation on this embodiment, collecting the preferences from the users involves randomly selecting pairs of items from the set of items to compare, and then collecting preferences from the users for the selected pairs of items. Alternatively, items can be selected in other ways. For example, one embodiment of the present invention uses a progressive-refinement technique, which selects items more evenly across the items to be ranked.

In a variation on this embodiment, a preference of a user between a first item and a second item can specify that the user: (1) prefers the first item over the second item; (2) prefers the second item over the first item; or (3) has no preference between the first item and the second item.

In a further variation, if the adjacency matrix is an n×n matrix associated with n items, each element $a_{ij}$ of adjacency matrix is computed as follows: (1) $a_{ij}=0$, if preferences between item i and item j are unknown; (2) $a_{ij}=$losses(i,j)/((wins(i,j)+losses(i,j)+ties(i,j))*n), if i≠j; and (3) $a_{ij}=1-$sum ($a_{ik}$ for all 0≦k<n and k≠i), if i=j. Note that this is only one possible implementation of the adjacency matrix; many other variations and implementations can be used.

In a variation on this embodiment, using the adjacency matrix to compute the preference ranking for the set of items involves computing a dominant eigenvector for the adjacency matrix.

In a further variation, computing the dominant eigenvector involves using an iterative process to compute the dominant eigenvector, wherein the iterative process uses a damping factor.

In a variation on this embodiment, the system uses the computed preference ranking to evaluate search results which comprise items from the set of items.

In a further variation, evaluating the search results involves: evaluating a single search result; or evaluating a page containing an ordered list of search results to be presented to a user.

In a variation on this embodiment, the system uses the computed preference ranking to produce a ranking for a set of search results, and then presents the ranking to a user.

In a variation on this embodiment, receiving the set of items involves receiving a set of search results from a search engine.

In a variation on this embodiment, the set of items can include, but is not limited to: web pages, documents, images, products, advertisements, video clips, or audio clips.

Note that the above-described preference ranking technique has advantages over standard sorting algorithms, (such as binary insertion sort or mergesort), which can also be used to produce a sorted order from pairwise comparisons. A major difference is that conventional sorting algorithms are much more sensitive to noise (they have unbounded error) and only produce an ordering, rather than a ranking. That is, preference rank outputs floating-point numbers which may not be evenly spaced, whereas sorting techniques output ordinals, and the additional precision inherent in the floating-point numbers helps to distinguish quality more effectively.

DETAILED DESCRIPTION

Figure 1:
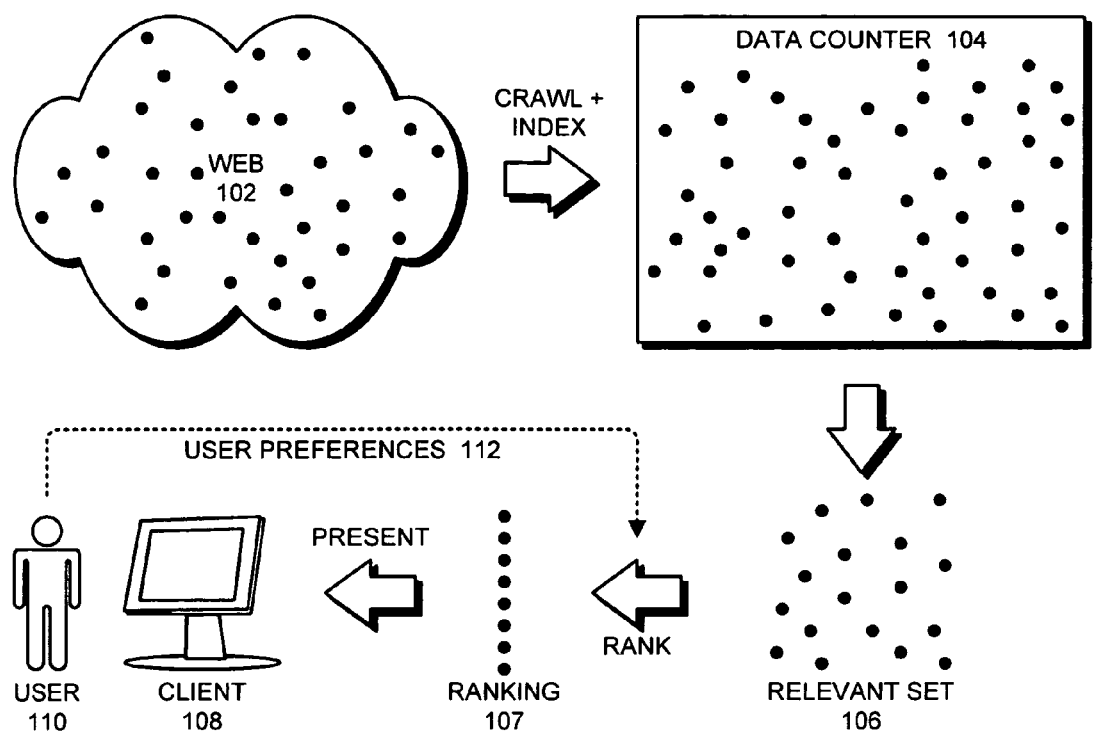
FIG. 1 illustrates the searching and ranking process in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage device, which may be any device that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention provides a system that measures the quality of search results based on a series of pairwise comparisons between search results by users. More specifically, the system starts with a set of items (e.g., search results), and randomly selects pairs of items to compare. Next, for each selected pair of items, the system asks users which item they prefer. Note that the more pairs the system asks users to compare, the more accurate the resulting ranking will be.

These pairwise comparisons can be applied to arbitrary items, such as news articles, advertisements, images and search results. Moreover, such comparisons can be used to compare quality between different types of items, for example comparing news articles against images. Hence, when computing metrics using this pairwise comparison information, we can consider results of all types and can filter the results as desired. This allows the system to evaluate all types of results inclusively.

One embodiment of the present invention uses a Markov process to generate a preference ranking. This Markov process is similar to the Markov process used in PageRank technique described in U.S. Pat. No. 6,285,999, entitled "Method for Node Ranking in a Linked Database," and in U.S. Pat. No. 6,799,176, entitled "Method for Scoring Documents in a Linked Database" both by inventor Lawrence Page. (Both of these patents are hereby incorporated by reference to disclose the details of this PageRank technique.) In general, the PageRank technique assigns a value to a page based on the number of links to that page, the number of links to those pages, and so on recursively.

The present invention replaces these "links" with "user preferences." For example, a "vote" for page A by page B is created if a user says page A is better than page B. Intuitively, better pages will obtain more votes, and will thus attain a higher rank.

More specifically, one embodiment of the present invention takes as input an adjacency matrix A, for which each element $a_{ij}$ defines a user preference between the page $p_i$ and the page $p_j$. In the PageRank technique, each array element $a_{ij}$ is defined as the number of links from page $p_i$ to $p_j$ divided by the total number of outgoing links from $p_i$. In contrast, one embodiment of the present invention defines au as the weighted loss ratio between page $p_i$ and $p_j$, which can be defined as follows:

$a_{ij}=0$, if the rating for $p_i$ to $p_j$ is unknown;

$a_{ij}(losses(i,j))/((wins(i,j)+losses(i,j)+ties(i,j))*n)$, where $i \neq j$;

$a_{ij}=1-sum(a_{ik}$ for all $0 \leq k < n$ and $k \neq i)$, where $i=j$.

There are several intuitive justifications for this definition. The value of $a_{ij}$ is zero when the relative merit of $p_i$ to $p_j$ is unknown. This is advantageous because it allows the system to extrapolate relative merit based on related comparisons, and because a non-zero value would introduce noise into the graph, and would consequently dilute the available information. Moreover, the value from $p_i$ to $p_j$ should ideally never be greater than $1/n$ because each pair-wise comparison should have equal weighting.

Figure 2:
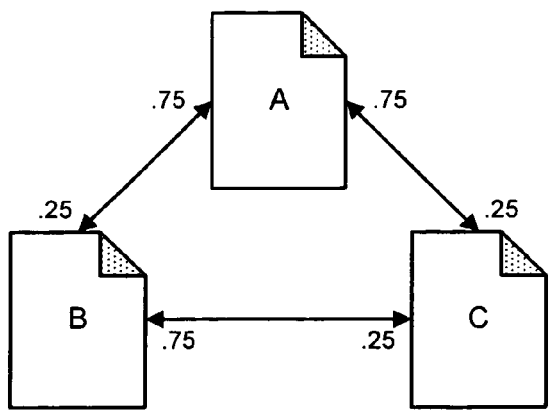
FIG. 2 illustrates exemplary pages with user preferences in accordance with an embodiment of the present invention.

As an example, consider the set of three pages illustrated in FIG. 2 where ratings between all of the pages are known. As illustrated in FIG. 2, page $p_A$ beat $p_B$ and $p_C$ three out of four times, and $p_B$ beat $p_C$ three out of four times. The corresponding adjacency matrix leads to the following preference ranking: $PR_A=52.1\%$, $PR_B=29.2\%$, and $PR_C=18.7\%$.

Searching and Ranking Process

FIG. 1 illustrates the searching and ranking process in accordance with an embodiment of the present invention. This process starts by crawling or otherwise searching through websites on web 102 to select a set of items, such as web pages, to be stored in indexed form in a data center 104. (These items are represented as dots in FIG. 1.) Next, the process extracts a relevant set of items 106 from the data center. This can involve, for example, using a search engine to search through items stored in data center 104 to select a relevant set of items. The system then ranks items in relevant set 106 based on user preferences (which are indicated by the dashed line in FIG. 1) to produce a ranking 107 of items in the relevant set. The system then presents the ranked results to a user 110 through a client system 108.

Note that the system can use the ranking 107 to rank search results before they are presented to a user. Alternatively, the system can use ranking 107 to evaluate the quality of a single search result or a page containing an ordered list of search results.

Process of Generating a Preference Ranking

Figure 3:
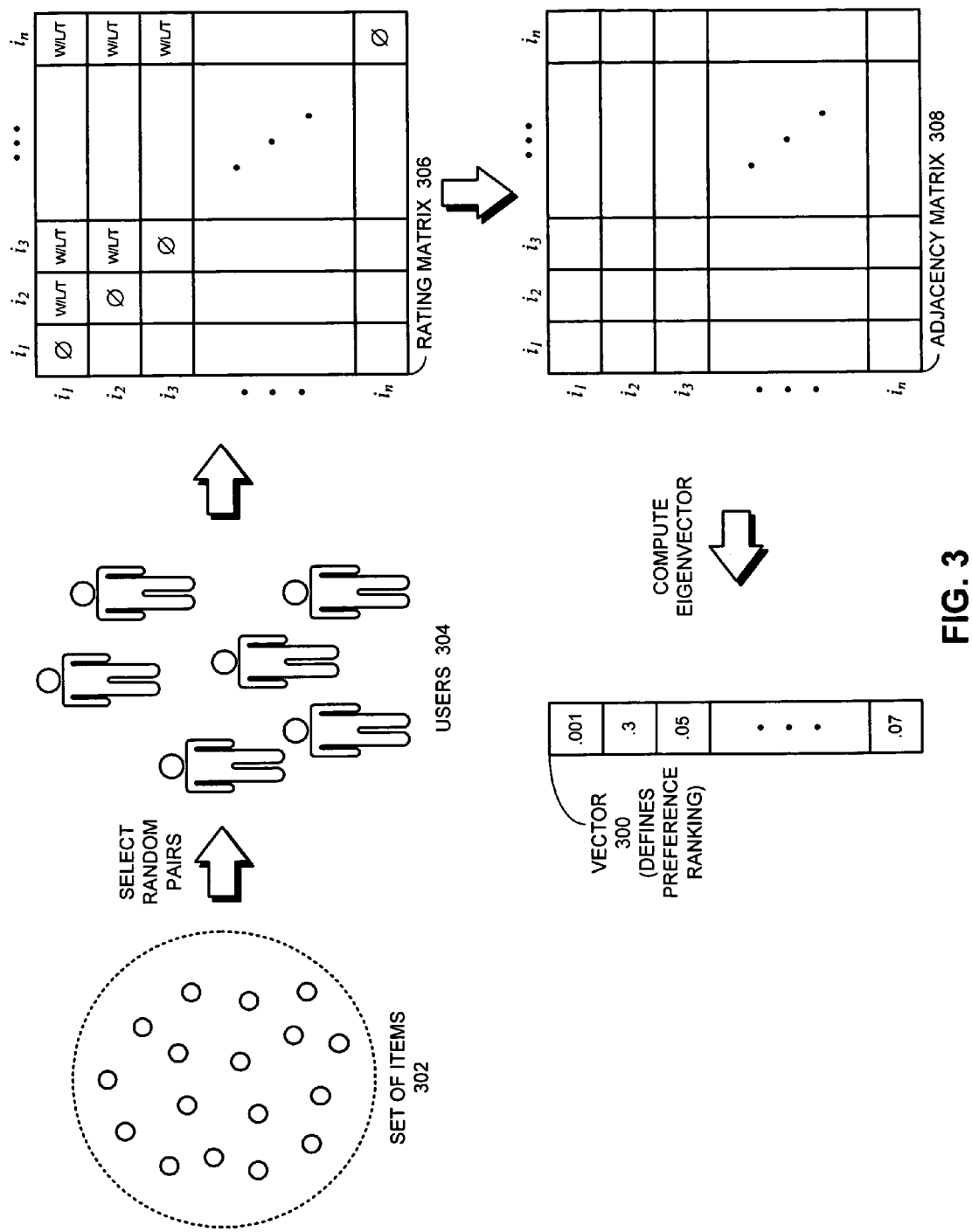
FIG. 3 graphically illustrates the process of generating a preference ranking in accordance with an embodiment of the present invention.
Figure 4:
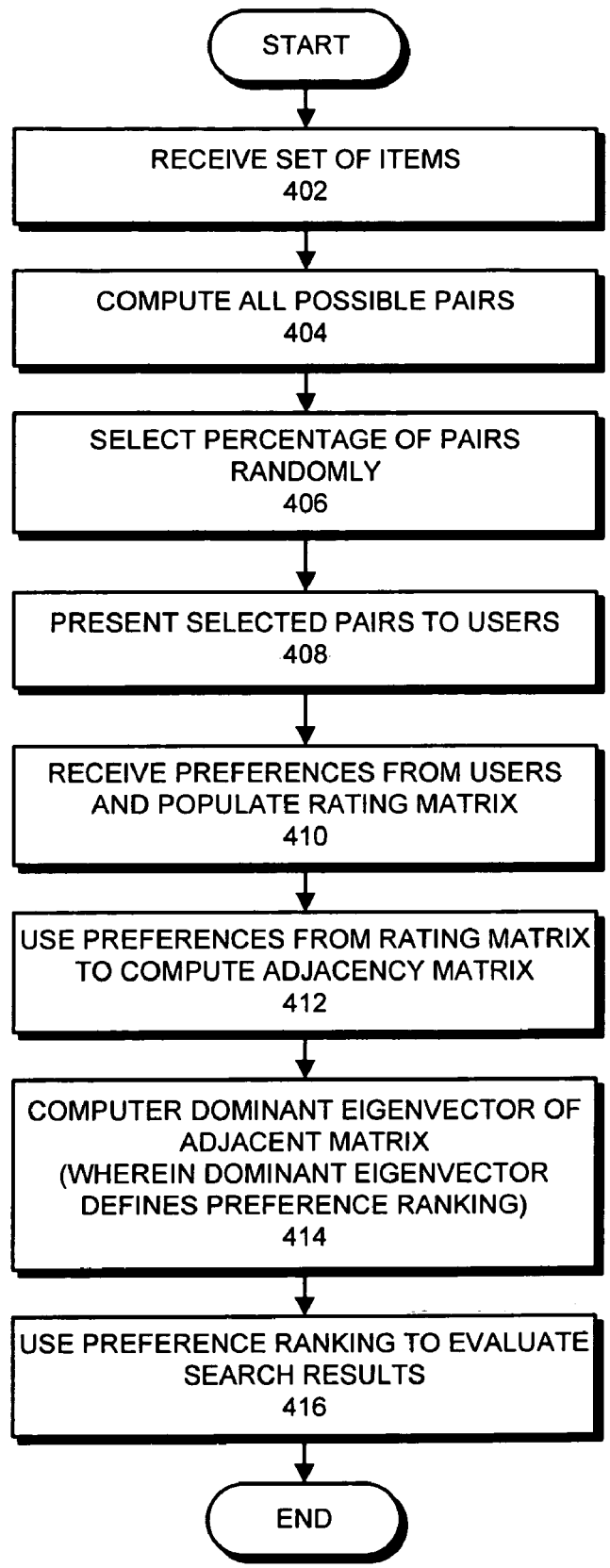
FIG. 4 presents a flow chart illustrating the process of generating a preference ranking in accordance with an embodiment of the present invention.

FIG. 3 graphically illustrates the process of generating a preference ranking and FIG. 4 presents a corresponding flow chart in accordance with an embodiment of the present invention. During this process, the system first receives a set of items 302 (step 402). Next, the system computes all possible pairs of items (step 404), and then randomly selects a percentage of the pairs (step 406). The selected pairs if items are then presented to users 304 (step 408). In one embodiment of the present invention, a rater is presented with a search query along with two associated search results which are presented side-by-side. The system then asks the rater to select from several options: e.g., left better than right, about the same, and right better than left.

Next, the system receives preferences (selections) from the users and uses the preferences to populate a rating matrix 306 (step 410). In one embodiment of the present invention, for each element $r_{ij}$ in the rating matrix 306, populating element $r_{ij}$ involves storing three values, W/L/T, in $r_{ij}$. Within the element $r_{ij}$, W indicates the number of times item i "wins" over item j, which means that a user prefers item i over item j. Similarly, L indicates the number of times item i "loses" to item j, which means that a user prefers item j over item i. Finally, T represents the number of times that item i "ties" with item j, which means that a user indicates a lack of preference between item i and item j.

Note that only the upper-diagonal portion of rating matrix 306 needs to be populated because the lower-diagonal portion is a mirror image of the upper-diagonal portion. Furthermore, the diagonal elements of rating matrix 306 are zero, because an element does not need to be compared against itself.

Next, rating matrix 306 is used to compute an adjacency matrix 308 (step 412). As was mentioned above, in one embodiment of the present invention this involves setting each element $a_{ij}$ in adjacency matrix 308 as follows:

$a_{ij}=0$, if the rating between item i and item j is unknown;

$a_{ij}=(\text{losses}(i,j))/((\text{wins}(i,j)+\text{losses}(i,j)+\text{ties}(i,j))*n)$, where $i \neq j$;

$a_{ij}=1-\text{sum}(a_{ik}$ for all $0 \leq k < n$ and $k \neq i)$, where $i=j$.

Note that the elements of each row and each column of this adjacency matrix are normalized to sum up to one. Also note that both the upper-diagonal portion and the lower-diagonal portion of the adjacency matrix are populated as well as the diagonal elements. If only a small number of ratings are known, the diagonal elements of the adjacency matrix tend to be set to one, which means that the adjacency matrix approximates the identity matrix.

Next, the system determines a preference ranking for the set of items by computing a dominant eigenvector for adjacency matrix 308. This can involve using any known technique for computing such an eigenvector.

One embodiment of the present invention uses a technique which is similar to the technique disclosed in the Wikipedia page "http:/en/wikipedia.org/wiki/PageRank" to compute this dominant eigenvector. For example, suppose there exist n items $i_1, i_2, \ldots, i_n$ and a corresponding n×n adjacency matrix A has been generated for the items. In this case, the system computes a dominant eigenvector R which can be represented as follows, $$R = \begin{bmatrix} PR(i_1) \\ PR(i_2) \\ \ldots \\ PR(i_n) \end{bmatrix}$$

wherein $PR(i_i)$ represents the "preference rank" of the item $i_i$. Similarly, the adjacency matrix A can be represented as $$A = \begin{bmatrix} a_{11} & a_{12} & \ldots & a_{1n} \\ a_{21} & a_{22} & & \\ \ldots & & & \\ a_{n1} & & & a_{nn} \end{bmatrix}.$$

wherein each element au defines a user preference between the item $i_i$ and the item $i_j$.

In this example, the eigenvector R can be determined by solving the following equation, $$R = \begin{bmatrix} (1-d)/n \\ (1-d)/n \\ \ldots \\ (1-d)/n \end{bmatrix} + d \begin{bmatrix} a_{11} & a_{12} & \ldots & a_{1n} \\ a_{12} & a_{22} & & \\ \ldots & & & \\ a_{n1} & & & a_{nn} \end{bmatrix} R$$

wherein d is a "damping factor," which for example can be 0.85. Note that the elements of the eigenvector R can be normalized to sum up to one.

After the equation is solved, the dominant eigenvector R contains values that define a preference ranking for the items $i_1, i_2, \ldots, i_n$.

As mentioned above, this preference ranking can be used to rank search results before they are presented to a user, or alternatively to evaluate the quality of a single search result or a page containing an ordered list of search results.

ALTERNATIVES

Although the present invention is described in the context of ranking web pages, it is not limited to web pages. In general, the present invention can be applied to many different ranking domains, such as images, documents, products, advertisements, video clips, audio clips and any other items that users can compare.

Moreover, the above-described preference ranking technique can be varied in a number of ways. For example, a different adjacency matrix definition can be used (e.g., inserting additional noise, or inferred comparisons); a different mechanism for selecting pairs of items to compare can be used (instead of random selection); and a different mechanism for presenting pairs of items to users can be used (e.g., instead of side-by-side and explicitly asking which item is preferred, inferring user preference using a more subtle technique like click-tracking).

It is also possible to incorporate a "degree" of preference into the ranking process to improve resulting ranking. For example, the users can enter scores in a seven-point scale ranging from "much better than" to "much worse than." However, this may require per-rater normalization, because raters may have differing thresholds for what constitutes a "slight" or "significant" preference. Additionally, the degree of preference can also be observed by asking multiple raters about their preferences and then looking at the distribution of their answers (for example, 4 out of 5 raters might prefer an option).

One embodiment of the present invention provides additional logic that facilitates ranking a set of items "incrementally." This incremental ranking process reuses results from previous comparisons to rank new items. By reusing the results from previous comparisons, this incremental ranking process can potentially save a significant amount of computational time.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method executed by a computer system for producing a preference ranking for a set of items based on preferences expressed by users, the method comprising:
   receiving the set of items at the computer system, wherein each item in the set is a search result;
   receiving preferences at the computer system from users between pairs of items in the set of items, wherein collecting the preferences from the users involves:
      selecting pairs of items from the set of items;
      presenting each of the pairs of items to users for comparison between items in a pair for the selected pairs; and
      collecting indications of preference from the users between items in the presented pairs;
   using the received preferences at the computer system to compute an adjacency matrix for the set of items, wherein each element in the adjacency matrix represents preferences between a corresponding pair of items associated with the element;
   using the adjacency matrix at the computer system to compute the preference ranking for the set of items;
   assigning the preference ranking at computer system for the set of items; and
   providing the ranked results to a user.

2. The method of claim 1, wherein the receiving the preferences from the users involves:
   randomly selecting pairs of items from the set of items to compare.

3. The method of claim 1, wherein a preference of a user between a first item and a second item can specify that the user:
   prefers the first item over the second item;
   prefers the second item over the first item; or
   has no preference between the first item and the second item.

4. The method of claim 3, wherein if the adjacency matrix is an n×n matrix associated with n items, each element $a_{ij}$ of adjacency matrix is computed as follows:

$a_{ij}=0$, if preferences between item i and item j are unknown;

$a_{ij}=\text{losses}(i,j)/((\text{wins}(i,j)+\text{losses}(i,j)+\text{ties}(i,j))*n)$, if $i \neq j$; and $a_{ij}=1-\text{sum}(a_{ik}$ for all $0 \leq k < n$ and $k \neq i)$, if $i=j$, wherein:
   wins(i,j) is the number of times item i is preferred over item j,
   losses(i,j) is the number of items item j is preferred over item i, and
   ties (i,j) is the number of times there is no preference between item i and item j.

5. The method of claim 1, wherein using the adjacency matrix to compute the preference ranking for the set of items involves computing a dominant eigenvector for the adjacency matrix.

6. The method of claim 1, wherein computing the dominant eigenvector involves using an iterative process to compute the dominant eigenvector, wherein the iterative process uses a damping factor.

7. The method of claim 1, wherein the method further comprises using the computed preference ranking to evaluate search results which comprise items from the set of items.

8. The method of claim 7, wherein evaluating the search results involves:
   evaluating a single search result; or
   evaluating a page containing an ordered list of search results to be presented to a user.

9. The method of claim 1, wherein the method further comprises:
   using the computed preference ranking to produce a ranking for a set of search results; and
   presenting the ranking to a user.

10. The method of claim 1, wherein receiving the set of items involves receiving a set of search results from a search engine.

11. The method of claim 1, wherein the set of items can include, but is not limited to:
   web pages;
   documents;
   images;
   products;
   advertisements;
   search results from a search engine or a web crawler;
   video clips; or
   audio clips.

12. A computer-readable storage device storing instructions that when executed by a computer cause the computer to perform a method for producing a preference ranking for a set of items based on preferences expressed by users, the method comprising:
   receiving the set of items wherein each item in the set is a search result;
   receiving preferences from users between pairs of items in the set of items, wherein collecting the preferences from the users involves:
      selecting pairs of items from the set of items;
      presenting each of the pairs of items to users for comparison between items in a pair for the selected pairs; and
      collecting indications of preference from the users between items in the presented pairs;
   using the received preferences to compute an adjacency matrix for the set of items, wherein each element in the adjacency matrix represents preferences between a corresponding pair of items associated with the element;
   using the adjacency matrix to compute the preference ranking for the set of items;
   assigning the preference ranking for the set of items; and
   providing the ranked results to a user.

13. The computer-readable storage device of claim 12, wherein the receiving the preferences from the users involves:
   randomly selecting pairs of items from the set of items to compare.

14. The computer-readable storage device of claim 12, wherein a preference of a user between a first item and a second item can specify that the user:
   prefers the first item over the second item;
   prefers the second item over the first item; or
   has no preference between the first item and the second item.

15. The computer-readable storage device of claim 12, wherein if the adjacency matrix is an n×n matrix associated with n items, each element $a_{ij}$ of adjacency matrix is computed as follows:

$a_{ij}=0$, if preferences between item i and item j are unknown;

$a_{ij}=losses(i,j)/((wins(i,j)+losses(i,j)+ties(i,j))*n)$, if $i \neq j$; and $a_{ij}=1-sum(a_{ik}$ for all $0 \leq k < n$ and $k \neq i)$, if $i=j$ wherein:
wins(i,j) is the number of times item i is preferred over item j,
losses(i,j) is the number of items item j is preferred over item i, and
ties (i,j) is the number of times there is no preference between item i and item j.

16. The computer-readable storage device of claim 12, wherein using the adjacency matrix to compute the preference ranking for the set of items involves computing a dominant eigenvector for the adjacency matrix.

17. The computer-readable storage device of claim 12, wherein computing the dominant eigenvector involves using an iterative process to compute the dominant eigenvector, wherein the iterative process uses a damping factor.

18. The computer-readable storage device of claim 12, wherein the method further comprises using the computed preference ranking to evaluate search results which comprise items from the set of items.

19. The computer-readable storage device of claim 18, wherein evaluating the search results involves:
evaluating a single search result; or
evaluating a page containing an ordered list of search results to be presented to a user.

20. The computer-readable storage device of claim 12, wherein the method further comprises:
using the computed preference ranking to produce a ranking for a set of search results; and
presenting the ranking to a user.

21. The computer-readable storage device of claim 12, wherein receiving the set of items involves receiving a set of search results from a search engine.

22. The computer-readable storage device of claim 12, wherein the set of items can include, but is not limited to:
web pages;
documents;
images;
products;
advertisements;
search results from a search engine or a web crawler;
video clips; or
audio clips.

23. An apparatus at a search engine embodied in a computer system that produces a preference ranking for a set of items based on preferences expressed by users, comprising:
a memory;
a processor;
a preference receiving mechanism embodied in the computer system configured to receive preferences from users between pairs of items in the set of items, wherein each item in the set is a search result, and wherein receiving the preferences from the users involves:
selecting pairs of items from the set of items;
presenting each of the pairs of items to users for comparison between items in a pair for the selected pairs; and
receiving indications of preference from the users between items in the presented pairs; and
a ranking mechanism embodied in the computer system configured to,
use the received preferences to compute an adjacency matrix for the set of items, wherein each element in the adjacency matrix represents preferences between a corresponding pair of items associated with the element,
use the adjacency matrix to compute the preference ranking for the set of items;
assign the preference ranking for the set of items; and to present the ranked results to a user.

* * * * *